(12) United States Patent
Hong et al.

(10) Patent No.: US 9,046,723 B2
(45) Date of Patent: Jun. 2, 2015

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Seung Ho Hong, Gunpo-si (KR); Oh Jeong Kwon, Hwaseong-si (KR); Hyeok Jin Lee, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/295,141

(22) Filed: Jun. 3, 2014

(65) Prior Publication Data

US 2014/0287646 A1   Sep. 25, 2014

Related U.S. Application Data

(62) Division of application No. 13/237,798, filed on Sep. 20, 2011, now Pat. No. 8,780,306.

(30) Foreign Application Priority Data

May 26, 2011   (KR) .................. 10-2011-0050195

(51) Int. Cl.
*G02F 1/1343* (2006.01)
*G02F 1/1362* (2006.01)
*G02F 1/139* (2006.01)
*G09G 3/36* (2006.01)

(52) U.S. Cl.
CPC ...... *G02F 1/13439* (2013.01); *G02F 1/134336* (2013.01); *G02F 1/13624* (2013.01); *G02F 1/1393* (2013.01); *G09G 3/364* (2013.01); *G02F 2001/134381* (2013.01); *G09G 2300/0426* (2013.01); *G09G 2300/043* (2013.01); *G09G 2320/0252* (2013.01)

(58) Field of Classification Search
CPC ...................................... G02F 1/1343
USPC .......................................... 349/141
See application file for complete search history.

(56) References Cited

U.S. PATENT DOCUMENTS

| | | | |
|---|---|---|---|
| 6,128,058 A | 10/2000 | Walton | |
| 8,304,039 B2 * | 11/2012 | Oh et al. | 428/1.2 |
| 8,379,176 B2 * | 2/2013 | Kim et al. | 349/142 |
| 8,542,336 B2 * | 9/2013 | Kim | 349/123 |
| 2008/0218645 A1 | 9/2008 | Zhu et al. | |
| 2010/0053528 A1 | 3/2010 | Li et al. | |
| 2011/0019142 A1 * | 1/2011 | Inoue et al. | 349/139 |
| 2011/0222010 A1 * | 9/2011 | Lee et al. | 349/139 |

* cited by examiner

*Primary Examiner* — Timothy L Rude
(74) *Attorney, Agent, or Firm* — Innovation Counsel LLP (57) ABSTRACT

A liquid crystal display and a manufacturing method are provided. A liquid crystal display according to an exemplary embodiment of the present invention includes: a first substrate; a second substrate facing the first substrate; a liquid crystal layer interposed between the first substrate and the second substrate, and including liquid crystal molecules; a first electrode positioned on the first substrate; an insulating layer positioned on the first electrode; a second electrode positioned on the insulating layer; and a third electrode positioned on the second substrate, wherein the second electrode includes a plurality of branches and a slit between neighboring ones of the branches, and a width of the slit is more than about two times to less than about five times a width of its corresponding branches.

11 Claims, 10 Drawing Sheets

LIQUID CRYSTAL DISPLAY AND MANUFACTURING METHOD THEREOF

CROSS-REFERENCE TO RELATED APPLICATION

This application is a divisional application of U.S. application Ser. No. 13/237,798 filed on Sep. 20, 2011, now U.S. Pat. No. 8,780,306 issued on Jul. 15, 2014, which claims priority to, and the benefit of, Korean Patent Application No. 10-2011-0050195 filed in the Korean Intellectual Property Office on May 26, 2011, the entire contents of which are incorporated herein by reference.

BACKGROUND OF THE INVENTION (a) Field of the Invention

Embodiments of the present invention relate generally to liquid crystal displays. More specifically, embodiments of the present invention relate to liquid crystal displays having reduced distortion and improved response speed.

(b) Description of the Related Art

A liquid crystal display is one of the types of flat panel display devices that has found wide use. The liquid crystal display commonly includes two display panels where field generating electrodes such as a pixel electrode and a common electrode are formed, and a liquid crystal layer is interposed therebetween.

The liquid crystal display generates an electric field in the liquid crystal layer by applying a voltage to the field generating electrodes, to determine orientations of liquid crystal molecules of the liquid crystal layer and control polarization of incident light, thereby displaying an image.

The liquid crystal display also includes a switching element connected to each pixel electrode, and a plurality of signal lines, including gate lines and data lines, for applying the voltage to the pixel electrode by controlling the switching element.

In one type of liquid crystal display, the vertically aligned mode liquid crystal display, long axes of the liquid crystal molecules are arranged to be vertical to a display panel when no electric field is applied. This configuration results in relatively high contrast ratio and wide reference viewing angle.

Particularly, in vertical alignment (VA) mode liquid crystal displays, a lower panel is formed with an electrode that has a minute slit, and an upper panel is formed with one continuous electrode body thereon, so that a common voltage can be applied to the entire panel. However, as the width of the minute slit is designed to be small, distortion of the electric field is increased. Therefore, the degree that the liquid crystal molecules are slanted is different at a portion where the electrodes are positioned, a portion corresponding to the edge of the electrode, and a portion where the electrodes do not exist, thereby generating a deterioration of transmittance and a deterioration of response time.

The above information disclosed in this Background section is only for enhancement of understanding of the background of the invention and therefore it may contain information not in the prior art.

SUMMARY OF THE INVENTION

The present invention provides a liquid crystal display and a manufacturing method thereof that reduce a distortion of an electric field and improve a response speed.

A liquid crystal display according to an exemplary embodiment of the present invention includes: a first substrate; a second substrate facing the first substrate; a liquid crystal layer interposed between the first substrate and the second substrate, and including liquid crystal molecules; a first electrode disposed on the first substrate; an insulating layer disposed on the first electrode; a second electrode disposed on the insulating layer; and a third electrode disposed on the second substrate, wherein the second electrode includes a plurality of branches and a slit between neighboring ones of the branches, and a width of the slit is more than about two times to less than about five times a width of its corresponding branches.

An alignment layer disposed on at least one of the second electrode and the third electrode may be further included.

At least one of the liquid crystal layer and the alignment layer may further include an alignment assistance agent.

The first electrode and the third electrode may have a unitary, continuous shape.

When a voltage applied to the first electrode is referred to as a first voltage, a voltage applied to the second electrode is referred to as a second voltage, and a voltage applied to the third electrode is referred to as a third voltage, at least one of the liquid crystal layer and the alignment layer may be exposed when differing ones of the first and second voltages are applied for a first time period, and same ones of the first and second voltages are applied for a second time period following the first time period.

The first voltage may be greater than or equal to the second voltage, so that the liquid crystal display may be driven in a state that an electric field generated within the liquid crystal layer is flattened.

The width of the slit may be greater than a cell gap of the liquid crystal layer.

When a portion of the liquid crystal layer corresponding to the branches of the second electrode is referred to as a first region, and a portion of the liquid crystal layer corresponding to the slit of the second electrode is referred to as a second region, alignment directions of the liquid crystal molecules of the first region and the liquid crystal molecules of the second region may be different from each other.

When a voltage applied to the first electrode is referred to as a first voltage, a voltage applied to the second electrode is referred to as a second voltage, and a voltage applied to the third electrode is referred to as a third voltage, at least one of the liquid crystal layer and the alignment layer may be exposed when differing ones of the first and second voltages are applied.

The liquid crystal display may further include: a gate line disposed on the first substrate; a data line disposed on the first substrate and intersecting the gate line; a first thin film transistor and a second thin film transistor connected to the gate line and the data line; a third thin film transistor connected to the gate line and the second thin film transistor; and a reference voltage line connected to the third thin film transistor, wherein the first electrode may be connected to the first thin film transistor, and the second electrode may be connected to the second thin film transistor.

The first electrode and the second electrode may be electrically connected to each other.

The second electrode may include a cross stem including a horizontal stem and a vertical stem crossing the horizontal stem, and a plurality of branches extending from the cross stem.

The second electrode may include a plurality of regions in which the plurality of branches extend from the cross stem in different directions.

The liquid crystal molecules disposed at a portion of the liquid crystal layer corresponding to the branches of the second electrode may be inclined according to a direction in which the branches extend.

A method of manufacturing a liquid crystal display according to another exemplary embodiment of the present invention includes: forming a first electrode on a first substrate; forming an insulating layer on the first electrode; forming a second electrode on the insulating layer; forming a third electrode on a second substrate facing the first substrate; forming an alignment layer on at least one of the second electrode and the third electrode; positioning the first substrate proximate to the second substrate; forming a liquid crystal layer interposed between the first substrate and the second substrate and including liquid crystal molecules; applying different voltages to the first electrode and the second electrode; after the applying different voltages, applying a voltage to the first electrode sequentially to be the same as the voltage applied to the second electrode; and irradiating light upon the liquid crystal layer while the voltage applied to the first electrode is the same as the voltage applied to the second electrode, wherein the second electrode includes a plurality of branches and a slit between neighboring ones of the branches, and at least one of the liquid crystal layer and the alignment layer includes an alignment assistance agent.

In the applying different voltages to the first electrode and the second electrode, the voltage applied to the first electrode may be the same as a voltage applied to the third electrode.

The first electrode and the third electrode may have a unitary, continuous shape.

The width of the slit may be greater than a cell gap of the liquid crystal layer.

The width of the slit may be more than about two times to less than about five times a width of the branches.

The width of the branches may be more than about two times the width of the slit.

A method of manufacturing a liquid crystal display according to another exemplary embodiment of the present invention includes: forming a first electrode on a first substrate; forming an insulating layer on the first electrode; forming a second electrode on the insulating layer; forming a third electrode on the second substrate facing the first substrate; forming an alignment layer on at least one of the second electrode and the third electrode; positioning the first substrate proximate to the second substrate; forming a liquid crystal layer interposed between the first substrate and the second substrate and including liquid crystal molecules; applying different voltages to the first electrode and the second electrode; and during the applying, irradiating light upon the liquid crystal layer, wherein the second electrode includes a plurality of branches and a slit between neighboring ones of the branches, and at least one of the liquid crystal layer and the alignment layer includes an alignment assistance agent.

In the applying different voltages to the first electrode and the second electrode, the voltage applied to the first electrode may be the same as a voltage applied to the third electrode.

During the irradiating, when a portion of the liquid crystal layer corresponding to the branches of the second electrode is referred to as a first region, and a portion of the liquid crystal layer corresponding to the slit of the second electrode is referred to as a second region, alignment directions of the liquid crystal molecules of the first region and the liquid crystal molecules of the second region are different from each other.

The first electrode and the third electrode may have a unitary, continuous shape.

The width of the slit may be formed to be greater than a cell gap of the liquid crystal layer. A liquid crystal display according to another exemplary embodiment of the present invention includes: a first substrate; a second substrate facing the first substrate; a liquid crystal layer interposed between the first substrate and the second substrate and including liquid crystal molecules; a first electrode positioned on the first substrate; an insulating layer positioned on the first electrode; a second electrode positioned on the insulating layer; and a third electrode positioned on the second substrate, wherein the second electrode includes a plurality of branches and a slit between neighboring ones of the branches, and a width of the slit is more than about two times to less than about five times a width of its corresponding branches.

As described above, according to an exemplary embodiment of the present invention, the width of the branches of the electrode is sufficiently larger than the width of the slit and the pretilt is formed such that distortion of the electric field may be reduced and response speed may be improved.

DETAILED DESCRIPTION OF THE EMBODIMENTS

Exemplary embodiments of the present invention will be described in detail with reference to the accompanying drawings. However, the present invention is not limited to exemplary embodiments described herein, but may be embodied in other forms. Rather, exemplary embodiments described herein are provided to thoroughly and completely understand the disclosed contents and to sufficiently transfer the ideas of the present invention to a person of an ordinary skill in the art.

In drawings, the thickness of layers and regions is exaggerated for clarity. It is to be noted that when a layer is referred to as being "on" another layer or substrate, it can be directly formed on another layer or substrate or can be formed on another layer or substrate through a third layer interposed therebetween. Like constituent elements are denoted by like reference numerals denotes throughout the specification.

Figure 1:
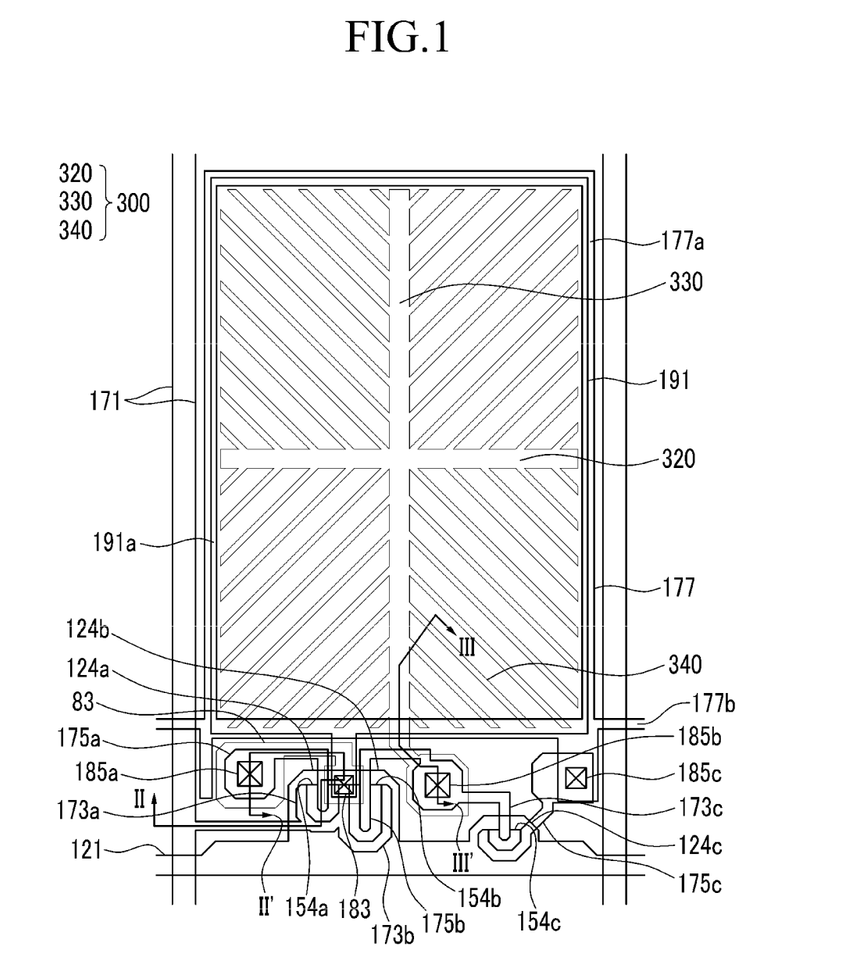
FIG. 1 is a layout view of a liquid crystal display according to an exemplary embodiment of the present invention.
Figure 2:
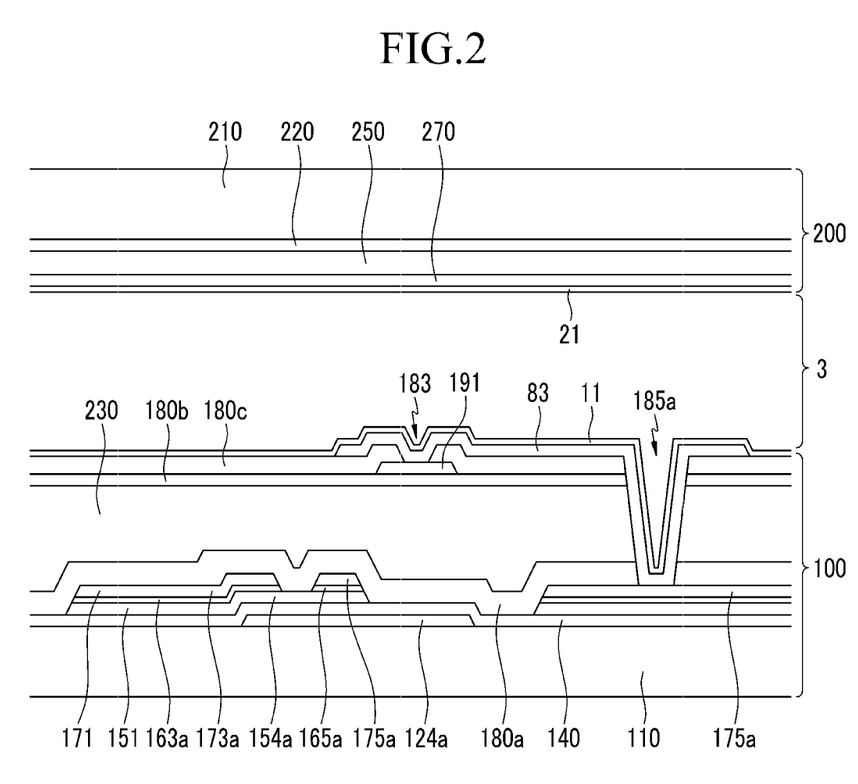
FIG. 2 is a cross-sectional view taken along the line II-II' of FIG. 1.

FIG. 1 is a layout view of a liquid crystal display according to an exemplary embodiment of the present invention. FIG. 2 is a cross-sectional view taken along the line II-II' of FIG. 1, and FIG. 3 is a cross-sectional view taken along the line III-III' of FIG. 1.

Figure 3:
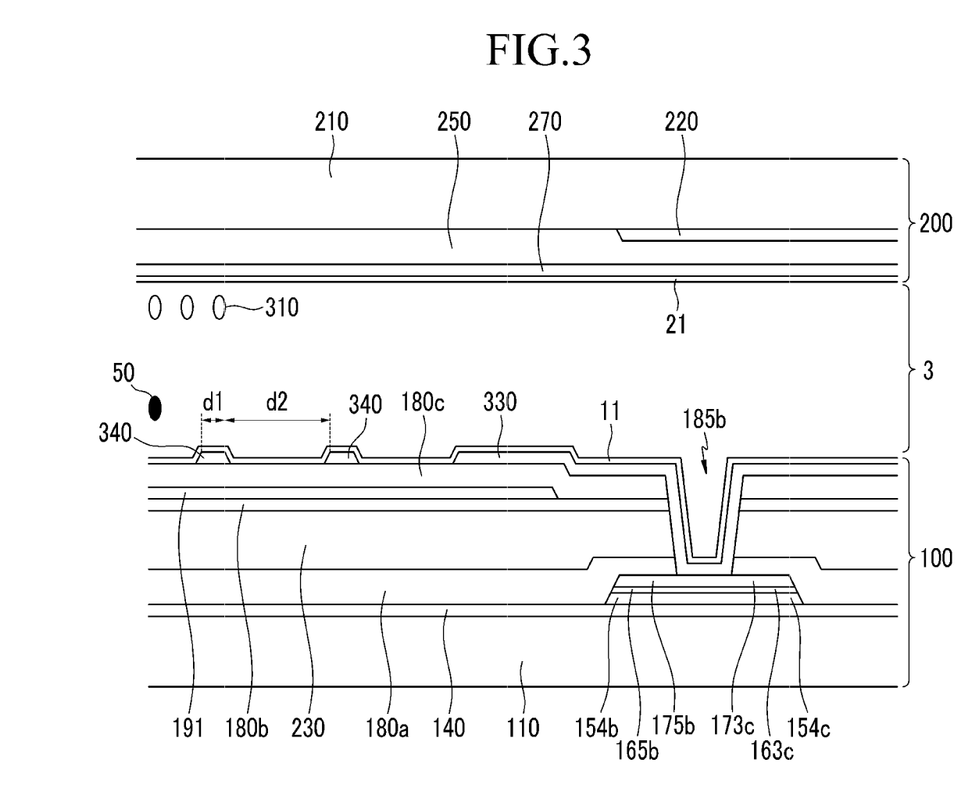
FIG. 3 is a cross-sectional view taken along the line III-III' of FIG. 1.

Referring to FIG. 1 to FIG. 3, the liquid crystal display according to the present exemplary embodiment includes a lower panel 100 and an upper panel 200 that face each other, a liquid display layer 3 including liquid crystal molecules 310 interposed between the panels 100 and 200, and a pair of polarizers (not shown) attached to the outside (i.e. outer surfaces) of the panels 100 and 200.

Firstly, the upper panel 200 will be described.

For the upper panel 200, a light blocking member 220 is formed on an upper substrate 210 corresponding to the second substrate and having transparent and insulating properties. The light blocking member 220 is called a black matrix, and prevents the leakage of light between pixel electrodes 191 and 300 positioned in the lower panel 100, which will be described later. The light blocking member 220 may have portions corresponding to (i.e. positioned over) a gate line 121 and a data line 171 and a portion corresponding to a thin film transistor.

Alternatively, the light blocking member 220 may be formed on a lower substrate 110 instead of the upper substrate 210.

An overcoat 250 is formed on the light blocking member 220. The overcoat 250 may be made of an insulating material, and provides a flat surface. The overcoat may optionally be omitted.

A common electrode 270, corresponding to a third electrode, is formed on the overcoat 250. Herein, the common electrode 270 may be formed as a single unitary plate shape in a pixel area. In other words, the common electrode 270 may be formed as a single unpatterned or unitary layer, with no cutouts formed therein.

Next, the lower panel 100 will be described.

A plurality of gate lines 121 are disposed on the lower substrate 110 corresponding to the first substrate and having an insulating property. The lower substrate 110 includes a pixel area. The gate line 121 transfers a gate signal, and mainly extends in a horizontal direction. The gate line 121 includes a first gate electrode 124a, a second gate electrode 124b, a third gate electrode 124c, and a wide end (not shown) for connection to other layers and to an external driving circuit.

A gate insulating layer 140 is formed on the gate line 121, and can be made of an insulating material such as silicon nitride. A first semiconductor 154a, a second semiconductor 154b, and a third semiconductor 154c are positioned on the gate insulating layer 140.

A plurality of ohmic contacts 163a, 165a, 163b, 165b, 163c, and 165c are positioned on the first semiconductor 154a, the second semiconductor 154b, and the third semiconductor 154c.

A data conductor is also formed, which has a plurality of data lines 171 including a first source electrode 173a and a second source electrode 173b, as well as a first drain electrode 175a, a second drain electrode 175b, a third source electrode 173a, a third drain electrode 175c, and a reference voltage line 177. The data conductor elements are positioned on the ohmic contacts 163a, 165a, 163b, 165b, 163c, and 165c and the gate insulating layer 140.

The data conductors, and the semiconductors and ohmic contacts positioned therebelow, may be simultaneously formed by using one mask.

The data line 171 includes a wide end (not shown) for connection with another layer and with an external driving circuit.

The reference voltage line 177 includes two longitudinal parts 177a generally parallel to the data line 171 and a generally transverse part 177b connecting the two longitudinal parts 177a to each other. Delay of a signal flowing into the reference voltage line 177 can be prevented by connecting the two longitudinal parts 177a of the reference voltage line 177 to the transverse part 177b.

The longitudinal part 177a of the reference voltage line 177 is positioned between pixel electrodes 191, 300 and the data line 171, and the reference voltage line 177 is connected to the third drain electrode 175c. The transverse part 177b of the reference voltage line 177 is positioned between the pixel electrodes 191, 300 and the gate line 121. Accordingly, the reference voltage line 177 may reduce signal interference between the pixel electrodes 191, 300 and the data line 171 and between the pixel electrodes 191, 300 and the gate line 121.

The first gate electrode 124a, the first source electrode 173a, and the first drain electrode 175a collectively form a first thin film transistor Qa together with the first semiconductor 154a, and a channel of the thin film transistor is formed in the semiconductor portion 154a between the first source electrode 173a and the first drain electrode 175a. Similarly, the second gate electrode 124b, the second source electrode 173b, and the second drain electrode 175b collectively form a second thin film transistor Qb together with the second semiconductor 154b. A channel of this second thin film transistor is formed in the semiconductor portion 154b between the second source electrode 173b and the second drain electrode 175b. The third gate electrode 124c, the third source electrode 173c, and the third drain electrode 175c collectively form a third thin film transistor Qc together with the third semiconductor 154c, and a channel of this third thin film transistor is formed in the semiconductor portion 154c between the third source electrode 173c and the third drain electrode 175c.

A first passivation layer 180a is formed on the data conductors 171, 173c, 175a, 175b, 175c, and 177 and the exposed semiconductor portions 154a, 154b, and 154c. The first passivation layer 180a may be made of an inorganic insulating material such as silicon nitride and/or silicon oxide.

An organic layer 230 is positioned on the first passivation layer 180a. The organic layer 230 includes a first contact hole 185a and a second contact hole 185b. The first contact hole 185a exposes the first drain electrode 175a, and the second contact hole 185b exposes the second drain electrode 175b.

The organic layer 230 may act to flatten or planarize, and may be a color filter. The organic layer 230 may extend in a vertical direction along columns of the pixel electrodes 191 and 300. Each color filter 230 may display one of three primary colors such as red, green, and blue. However, it is not limited to three primary colors such as red, green, and blue, and may display one of cyan, magenta, yellow, and white-based colors.

An overcoat 180b is positioned on the organic layer 230. The overcoat 180b may be made of an insulating material, and prevents the color filter 230 from being exposed in addition to providing a flat surface. A first electrode 191 is positioned on the overcoat 180b. The first electrode 191 may be made of a transparent conductive material such as ITO or IZO, or a reflective metal such as aluminum, silver, chromium, or alloys thereof.

A second passivation layer 180c is positioned on the first electrode 191. The second passivation layer 180c includes a dummy hole 183 exposing the first electrode 191. A dummy pattern 83 and a second electrode 300 are positioned on the second passivation layer 180c. The dummy pattern 83 is formed so as to fill the contact hole 185a and the dummy hole 183, to thereby electrically connect the first drain electrode 175a and the first electrode 191.

One end portion of the longitudinal stem 330 of the second electrode 300 is elongated and is electrically connected to the second drain electrode 175b through the second contact hole 185b.

The second electrode 300 is positioned to cover most of the unit pixel area and has a slit structure. The second electrode 300 has an overall quadrangle shape and includes a cross stem with a transverse stem 320 and a longitudinal stem 330 crossing the horizontal stem 320. Further, the second electrode 300 is divided into four subregions by the transverse stem 320 and the longitudinal stem 330, and each subregion includes a plurality of minute branches 340. A portion where the second electrode 300 does not exist between the neighboring branches 340 corresponds to the slit.

As shown in FIG. 3, the width d2 of the slit corresponding to the interval between the branches 340 may be more than about two times to less than about five times the width d1 of the branches 340. Also, the width d2 of the slit may be larger than the height of the cell gap of the liquid crystal layer 3.

Electrodes formed with conventional minute slit structures are designed to decrease the width of the branches such that a force pressing strongly the liquid crystal molecules on the branches at both edges of the branches is required. Also, the width of the slit is designed to be sufficiently small such the elastic force of the liquid crystal molecules moved on the branches must be sufficiently transmitted for the liquid crystal molecules on the slit where the electrode does not exist. However, in this case, the distortion of the electric field is serious by the minute electrode pattern such that the degree that the liquid crystal molecules are slanted is different on the electrode, the edge portion of the electrode, and the slit, resultantly the deterioration of the transmittance and the deterioration of the response time are generated. Also, in the case of the minute slit, it is difficult to pattern the minute slit, and a short between the neighboring electrodes may be frequently generated.

However, according to the present exemplary embodiment, the width d1 of the branches 340 is sufficiently larger than the width d2 between the neighboring branches 340 (i.e. the slit width), that transmittance deterioration and response time deterioration may be prevented or adequately reduced. Also, the width d2 of the slit is sufficiently large that it is easy to pattern the branches 340 and the probability of electrical shorts being generated between the neighboring electrodes is reduced.

As the width d2 of the slit is increased, the force required to move the liquid crystal molecules in the portion where the electrode does not exist becomes insufficient. To solve this problem, according to the present exemplary embodiment, the voltage applied to the first electrode 191 and the voltage applied to the second electrode 300 are initially different, and then the liquid crystal layer 3 or alignment layers 11 and 21 are exposed to a state in which voltage applied to the first electrode 191 and the voltage applied to the second electrode 300 are substantially the same. Also, the voltage of the first electrode 191 is greater than or equal to the voltage of the second electrode 300 such that the electric field existing in the liquid crystal layer 3 is driven in a substantially flattened state. This will be described later.

Differently from the above-described structure of the second electrode 300, the width d1 of the branches 340 may be more than two times the width d2 of the slit.

The second electrode 300 having the slit structure will now be described in further detail.

The branches 340 of the second electrode 300 may have a total of four groups, one group of which obliquely extends in the left upper direction from the transverse stem 320 or and the longitudinal stem 330, and another group of which obliquely extends in the right upper direction from the transverse stem 320 or the longitudinal stem 330. Also, another group obliquely extends in the left lower direction from the transverse stem 320 or the longitudinal stem 330, and the other group obliquely extends in the right lower direction from the transverse stem 320 or the longitudinal stem 330. The branches 340 of two neighboring regions may cross. Although not shown, the width of the branches 340 may gradually increase with distance from their respective stem.

The first electrode 191 may have a generally rectangular, platelike or planar shape in a unit pixel area.

The unit pixel area may be a region crossing the gate line 121 and the data line 171, but is not necessarily limited thereto.

The alignment layers 11 and 21 are disposed at the inside of each of the panels 100 and 200, and may be vertical alignment layers.

Polarizers (not shown) are disposed at the outside of the panels 100 and 200, and the polarization axes of two polarizers are perpendicular to each other with one polarization axis preferably parallel to the gate line 121. In the case of a reflective liquid crystal display, one of the two polarizers may be omitted.

The liquid crystal layer 3 is interposed between the panels 100 and 200, and liquid crystal molecules 310 included in the liquid crystal layer 3 may have negative dielectric anisotropy. The liquid crystal molecules 310 of the liquid crystal layer 3 have a pretilt, so that a long axis is approximately parallel to a longitudinal direction of the minute branch 340 of the second electrode 300, and may be aligned so as to be perpendicular to the surfaces of the panels 100 and 200 when no electric field is applied. Further, the liquid crystal layer 3 includes an alignment assistance agent 50 including a reactive mesogen, and the liquid crystal molecules 310 may have a pretilt so that the long axis thereof is approximately parallel to the longitudinal direction of the minute branches 340 of the second electrode 300, as assisted by the alignment assistance agent 50.

In another exemplary embodiment of the present invention, the alignment assistance agent may be included in the alignment layers 11 and 21 instead of the liquid crystal layer 3. In this case, the alignment layers 11 and 21 include a main-chain and a side-chain, and the alignment assistance agent is connected to the side-chain and may be electrically negative.

Figure 4:
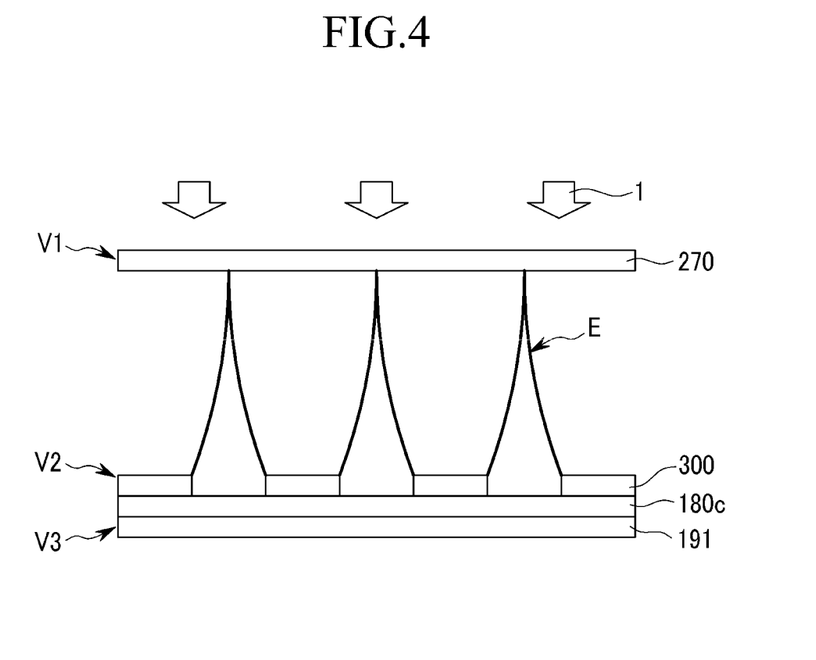
FIG. 4 is a cross-sectional view schematically showing an electric field direction under an electric field exposure in the exemplary embodiment of FIG. 1.
Figure 5:
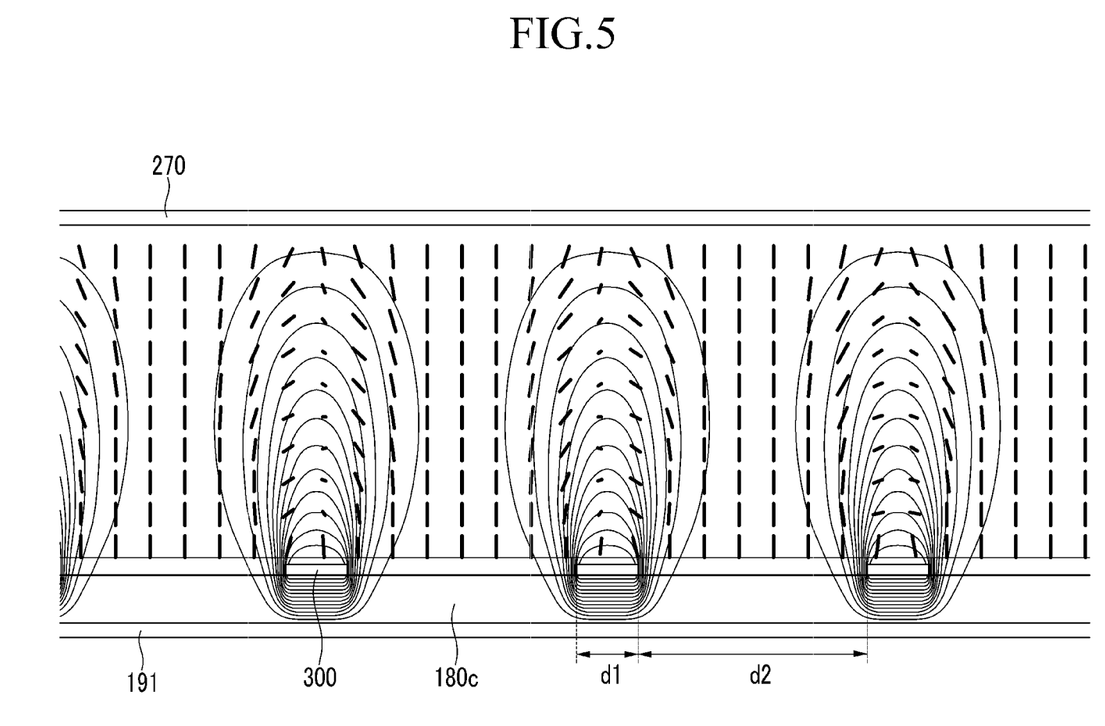
FIG. 5 to FIG. 7 are cross-sectional views showing a method of forming a pre-tilt to manufacturing a liquid crystal display according to an exemplary embodiment of the present invention.
Figure 6:
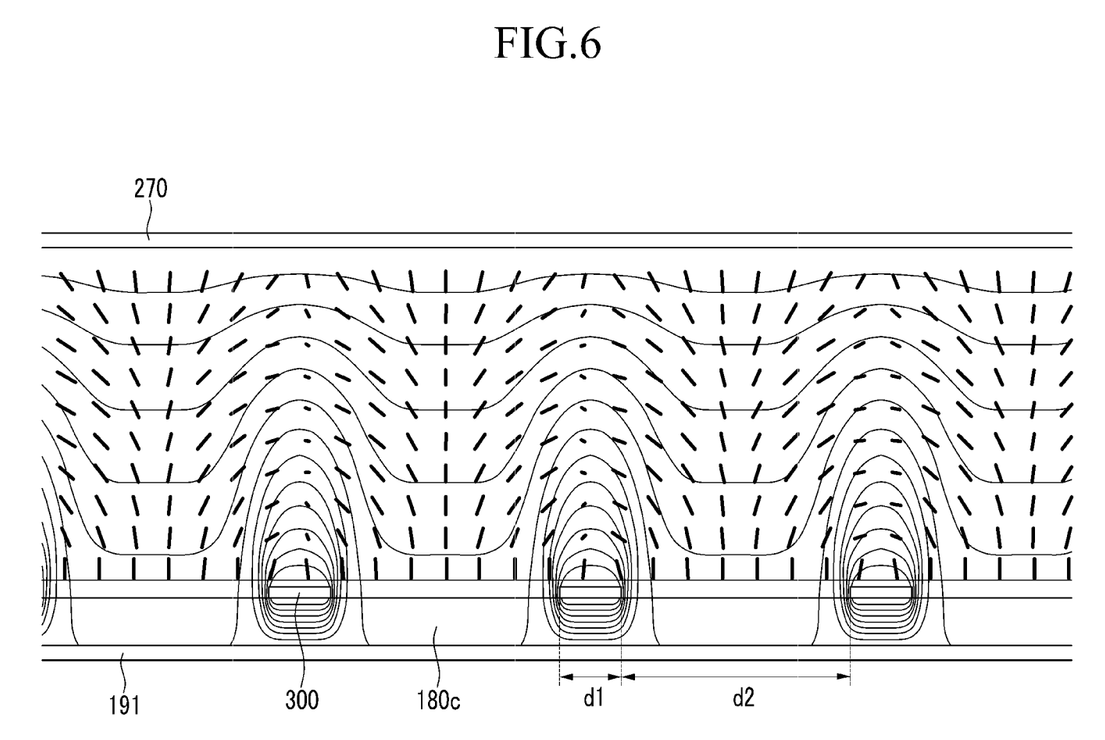
Figure 7:
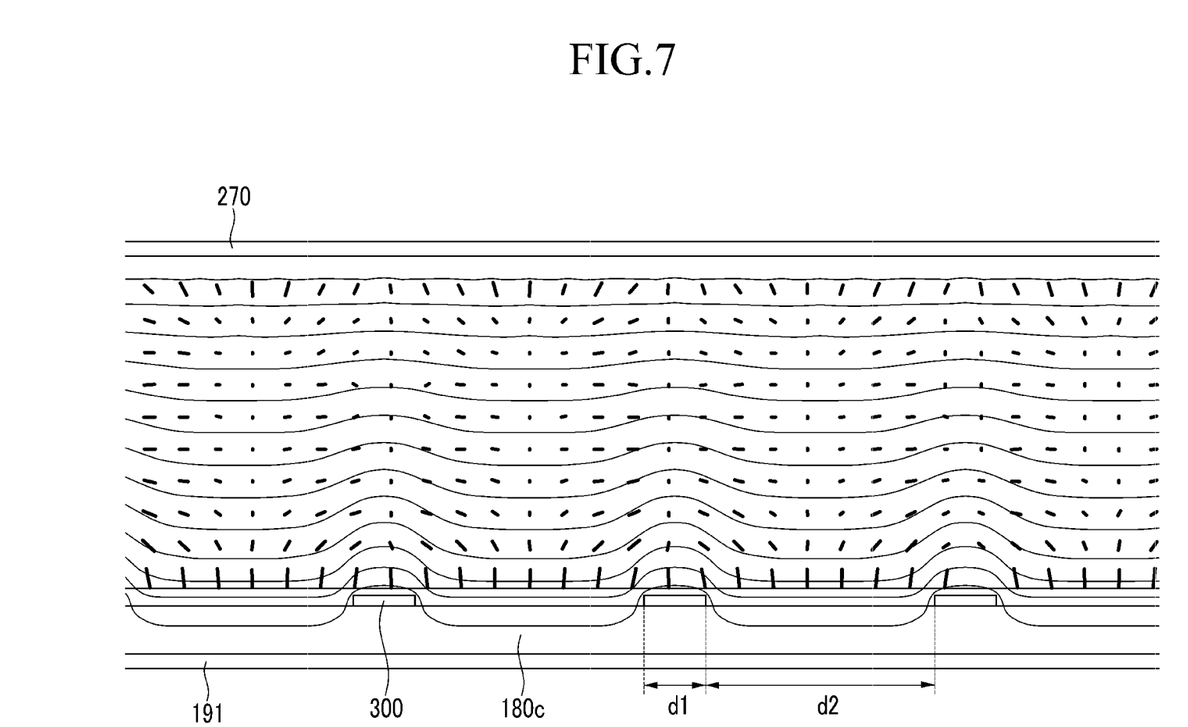

Hereinafter, a manufacturing method of a liquid crystal display according to another exemplary embodiment of the present invention will be described with reference to FIG. 1 to FIG. 7. FIG. 4 is a cross-sectional view schematically showing an electric field generated by the exemplary embodiment of FIG. 1. FIG. 5 to FIG. 7 are cross-sectional views showing a method of forming a pre-tilt to manufacture a liquid crystal display according to an exemplary embodiment of the present invention. A line shown in FIG. 5 to FIG. 7 corresponds to an equipotential line.

Referring to FIG. 1 to FIG. 3, a first panel 100 and a second panel 200 are manufactured, respectively.

The upper panel 200 is manufactured as follows. A light blocking member 220 is formed on the upper substrate 210 and then an overcoat 250 is formed thereon. A common electrode 270 is formed on the overcoat 250. An alignment layer 21 is formed on the common electrode 270.

The lower panel 100 is manufactured as further described below.

A gate line 121 (including gate electrodes 124a, 124b, and 124c), a gate insulating layer 140, semiconductor layers 151, 154a, 154b, and 154c, a data line 171 including source electrodes 173a, 173b, and 173c, drain electrodes 175a, 175b, and 175c, and a first passivation layer 180a are sequentially formed by stacking and patterning a plurality of thin films on the lower substrate 110.

An organic layer 230 is formed on the first passivation layer 180a.

An overcoat 180b is formed on the organic layer 230, and a conductive layer such as ITO or IZO is stacked and patterned on the overcoat 180b to form a first electrode 191 that is disposed at a part of a unit pixel area and has a roughly planar shape. Subsequently, a second passivation layer 180c is formed on the first electrode 191.

A first contact hole 185a exposing the first drain electrode 175a, a second contact hole 185b exposing the second drain electrode 175b, and a dummy hole 183 exposing the first electrode 191 are formed by patterning the second passivation layer 180c.

A dummy pattern 83 and a second electrode 300 that electrically connect the first drain electrode 175a and the first electrode 191 are formed by stacking and patterning the conductive layer on the second passivation layer 180c. Thereafter, an alignment layer 11 is coated on the second electrode 300.

Next, a liquid crystal layer 3 is formed by assembling the lower panel 100 and the upper panel 200, and injecting a mixture of liquid crystal molecules 310 and an alignment assistance agent 50 therebetween. However, the liquid crystal layer 3 may be formed by dripping the mixture of liquid crystal molecules 310 and alignment assistance agent 50 on the lower panel 100 or the upper panel 200. In the exemplary embodiment, the alignment assistance agent 50 is included in the liquid crystal layer 3, but in other exemplary embodiments, the alignment assistance agent 50 may be formed so as to be included in alignment layers 11 and 21 rather than the liquid crystal layer 3.

Next, referring to FIG. 4, a voltage is applied to the first electrode 191 and the second electrode 300. When the voltage applied to the first electrode 191 is referred to as a first voltage V1, the voltage applied to the second electrode 300 is referred to as a second voltage V2, and the voltage applied to the common electrode 270 is referred to as a third voltage V3, the first voltage V1 is lower than the second voltage V2. The first voltage V1 may be equal to the third voltage V3. In detail, the first voltage V1 and the third voltage V3 may be about 0, and the second voltage V2 may be about 7V.

That is, application of a second voltage V2 that is larger than the first voltage V1 and the third voltage V3 forms a fringe field (E). The liquid crystal molecules 310 are inclined by the generated fringe field. At this time, the liquid crystal molecules 310 positioned on the branches 340 and the liquid crystal molecules 310 positioned on the edges of the branches 340 may be inclined by the vertical electric field and the fringe field. However, as the first voltage V1 and the third voltage V3 are equal to each other, no electric field is applied so that it is difficult for the liquid crystal molecule 310 positioned on the slit to have a directional characteristic. As shown in FIG. 5, the width d2 of the slit is made sufficiently wide that the elastic force of the liquid crystal molecules 310 inclined at the edge of the branches 340 is weak, and thus the liquid crystal molecules 310 maintain their vertical alignment state for the display panels 100 and 200. The liquid crystal molecules 310 of the liquid crystal layer 3 corresponding to the branches 340 of the second electrode 300 may be inclined in the direction that the branches 340 extend.

Next, the first voltage V1 may be made equal to the second voltage V2. Also, a voltage that is larger than the initial value of the first voltage V1 but smaller than the second voltage V2 may be applied to the first electrode 191. Here, as shown in FIG. 6, the liquid crystal molecules 310 positioned at the slit are slightly inclined according to the direction that the liquid crystal molecules 310 positioned at the edge of the branches 340 are inclined.

Next, as shown in FIG. 7, if the first voltage V1 is increased to be equal to the second voltage V2, the liquid crystal molecules 310 positioned at the slit are slanted in almost the same direction as that of the liquid crystal molecules 310 positioned at the edge of the branches 340. In this state, the liquid crystal layer 3 is exposed. Accordingly, the liquid crystal molecules 310 may have a pretilt.

Figure 8:
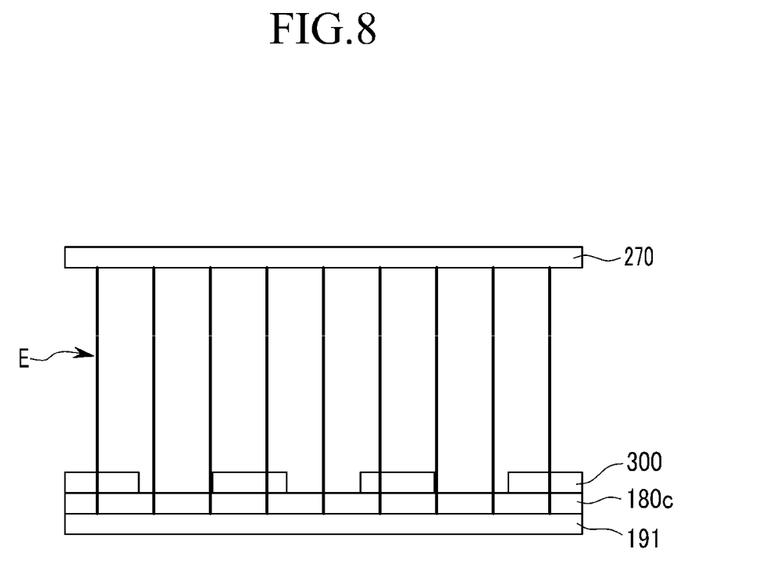
FIG. 8 is a view schematically showing an electric field direction under driving of the liquid crystal display manufactured according to the exemplary embodiment of FIG. 4 to FIG. 7.

FIG. 8 is a view schematically showing an electric field direction under driving of the liquid crystal display manufactured according to the exemplary embodiment of FIG. 4 to FIG. 7.

Referring to FIG. 8, the liquid crystal display manufactured according to the exemplary embodiment shown in FIG. 4 to FIG. 7 may be driven under conditions as follows. The first voltage V1 applied to the first electrode 191 is higher than the second voltage V2 applied to the second electrode 300 or at least equal thereto, such that the liquid crystal display according to the present exemplary embodiment is driven in the state that the electric field within the liquid crystal layer 3 is substantially flat. As described above, the first electrode 191 may have a data voltage applied through the data line 171, and a voltage that is decreased by resistance may be applied to the second electrode 300. A common voltage of predetermined magnitude is applied to the common electrode 270. Accordingly, most of the liquid crystal molecules 310 are moved by the vertical electric field E generated between the common electrode 270 and the first electrode 191, so that the transmittance decrease by the horizontal electric field may be minimized, and high speed response may be realized.

Next, a liquid crystal display and a manufacturing method thereof according to another exemplary embodiment of the present invention will be described.

Differently from the above-described exposure method, in the present exemplary embodiment, the liquid crystal layer 3 may be exposed to a state in which the first electrode 191 and the second electrode 300 have different voltages applied thereto. Again referring to FIG. 6, the liquid crystal molecule 310 on the branches 340 and the liquid crystal molecule 310 on the slit between the branches 340 may be aligned with different inclination angles and azimuth angles. In the state of the liquid crystal alignment of FIG. 6, the liquid crystal layer 3 is exposed such that the pretilt angle and the azimuth angle form the different regions.

When a portion of the liquid crystal layer 3 corresponding to the branches 340 of the second electrode 300 is referred to as a first region, and a portion of the liquid crystal layer 3 corresponding to the slit of the second electrode 300 is referred to as a second region, the alignment direction of the liquid crystal molecules 310 of the first region and the alignment direction of the liquid crystal molecules 310 of the second region are different under the driving of the liquid crystal display according to the present exemplary embodiment. Accordingly, visibility can be improved by showing the same effect as dividing the pixel.

Except for the above-described difference, the description of most of the exemplary embodiment of FIG. 1 to FIG. 7 may be applied to the present exemplary embodiment.

Figure 9:
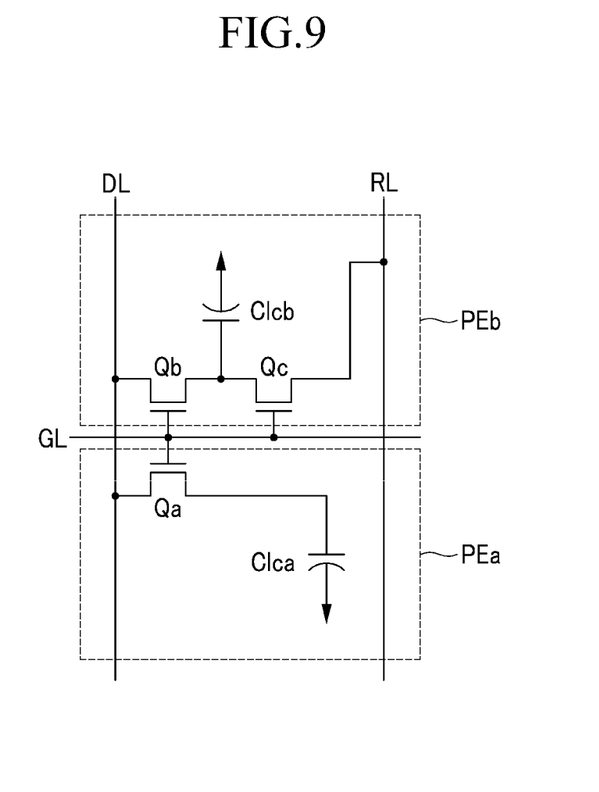
FIG. 9 is an equivalent circuit diagram for one pixel of the liquid crystal display shown in FIG. 1.
Figure 10:
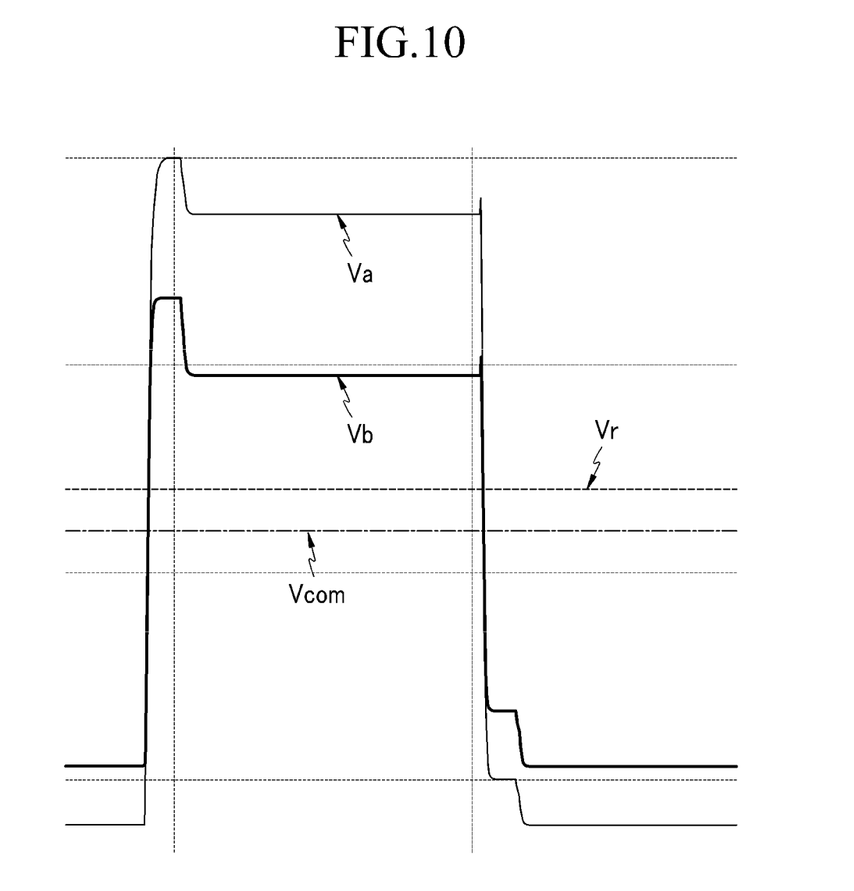
FIG. 10 is a waveform diagram of signals applied to the pixel of the liquid crystal display shown in FIG. 1.

Hereinafter, a layout of a signal line and a pixel of the liquid crystal display according to the exemplary embodiment of the present invention and a driving method thereof will be described as an example with reference to FIG. 9 and FIG. 10. FIG. 9 is an equivalent circuit diagram for one pixel of the liquid crystal display shown in FIG. 1. FIG. 10 is a waveform diagram of signals applied to the pixel of the liquid crystal display shown in FIG. 1.

Referring to FIG. 9, one pixel PX of the liquid crystal display according to the exemplary embodiment of the present invention employs a plurality of signal lines including a gate line GL transmitting a gate signal, a data line DL transmitting a data signal, and a reference voltage line RL transmitting a divided reference voltage. The pixel PX also includes a first switching element Qa, a second switching element Qb, a third switching element Qc, a first liquid crystal capacitor Clca, and a second liquid crystal capacitor Clcb which are connected to the plurality of signal lines.

The first switching element Qa and the second switching element Qb are respectively connected to the gate line GL and the data line DL, and the third switching element Qc is connected to the output terminal of the second switching element Qb and a reference voltage line RL.

The first switching element Qa and the second switching element Qb are three-terminal thin film transistors. Control terminals thereof are connected to the gate line GL, input terminals are connected to the data line DL, an output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is also a three-terminal thin film transistor. A control terminal thereof is connected to the gate line GL, an input terminal is connected to the second liquid crystal capacitor Clcb, and an output terminal is connected to the reference voltage line RL.

Referring to FIG. 10, when a gate on signal Von is applied to the gate line GL, the first switching element Qa, the second switching element Qb, and the third switching element Qc are each turned on. Accordingly, the data voltage applied to the data line DL is separately applied to a first electrode PEa and a second electrode PEb through the first switching element Qa and the second switching element Qb. In this case, the data voltages applied to the first electrode PEa and the second electrode PEb may be charged at the same value. However, according to the exemplary embodiment of the present invention, the voltage applied to the second electrode PEb is divided through the third switching element Qc connected with the second switching element Qb in series. Accordingly, the voltage Vb applied to the second electrode PEb is smaller than the voltage Va applied to the first electrode PEa.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of Symbols> | | | |
|---|---|---|---|
| 121 | gate line | 171 | data line |
| 180a | first passivation layer | 180b | overcoat |
| 180c | second passivation layer | 230 | organic layer |
| 191 | first electrode | 270 | common electrode |
| 280 | insulating layer | 300 | second electrode |

What is claimed is:

1. A method of manufacturing a liquid crystal display, comprising:
   forming a first electrode on a first substrate;
   forming an insulating layer on the first electrode;
   forming a second electrode on the insulating layer;
   forming a third electrode on a second substrate facing the first substrate;
   forming an alignment layer on at least one of the second electrode and the third electrode;
   positioning the first substrate proximate to the second substrate;
   forming a liquid crystal layer interposed between the first substrate and the second substrate and including liquid crystal molecules;
   applying different voltages to the first electrode and the second electrode;
   after the applying different voltages, applying a voltage to the first electrode sequentially to be the same as the voltage applied to the second electrode; and
   irradiating light upon the liquid crystal layer while the voltage applied to the first electrode is the same as the voltage applied to the second electrode,
   wherein the second electrode includes a plurality of branches and a slit between neighboring ones of the branches, and
   at least one of the liquid crystal layer and the alignment layer includes an alignment assistance agent.

2. The method of claim 1, wherein
in the applying different voltages to the first electrode and the second electrode, the voltage applied to the first electrode is the same as a voltage applied to the third electrode.

3. The method of claim 2, wherein
the first electrode and the third electrode have a unitary, continuous shape.

4. The method of claim 3, wherein
a width of the slit is greater than a cell gap of the liquid crystal layer.

5. The method of claim 4, wherein
the width of the slit is more than about two times to less than about five times a width of the branches.

6. The method of claim 4, wherein
the width of the branches is more than about two times the width of the slit.

7. A method of manufacturing a liquid crystal display, comprising:
   forming a first electrode on a first substrate;
   forming an insulating layer on the first electrode;
   forming a second electrode on the insulating layer;
   forming a third electrode on the second substrate facing the first substrate;
   forming an alignment layer on at least one of the second electrode and the third electrode;
   positioning the first substrate proximate to the second substrate;
   forming a liquid crystal layer interposed between the first substrate and the second substrate and including liquid crystal molecules;
   applying different voltages to the first electrode and the second electrode; and
   during the applying, irradiating light upon the liquid crystal layer,
   wherein the second electrode includes a plurality of branches and a slit between neighboring ones of the branches, and
   at least one of the liquid crystal layer and the alignment layer includes an alignment assistance agent.

8. The method of claim 7, wherein
in the applying different voltages to the first electrode and the second electrode, the voltage applied to the first electrode is the same as a voltage applied to the third electrode.

9. The method of claim 8, wherein
during the irradiating,
when a portion of the liquid crystal layer corresponding to the branches of the second electrode is referred to as a first region, and a portion of the liquid crystal layer corresponding to the slit of the second electrode is referred to as a second region, alignment directions of the liquid crystal molecules of the first region and the liquid crystal molecules of the second region are different from each other.

10. The method of claim 9, wherein
the first electrode and the third electrode a unitary, continuous shape.

11. The method of claim 10, wherein
a width of the slit is greater than a cell gap of the liquid crystal layer.

* * * * *